(No Model.) 3 Sheets—Sheet 1.

O. OHLSSON.
CENTRIFUGAL SEPARATING MACHINE.

No. 528,683. Patented Nov. 6, 1894.

WITNESSES: Robert Sollberger, Louisa Browne.

INVENTOR: Olof Ohlsson,
BY Drake & Co. ATTY'S.

(No Model.) 3 Sheets—Sheet 2.

O. OHLSSON.
CENTRIFUGAL SEPARATING MACHINE.

No. 528,683. Patented Nov. 6, 1894.

WITNESSES: INVENTOR:
Robert Sollberger Olof Ohlsson,
Louisa Browne. BY Drake & G ATTY'S.

(No Model.) 3 Sheets—Sheet 3.

O. OHLSSON.
CENTRIFUGAL SEPARATING MACHINE.

No. 528,683. Patented Nov. 6, 1894.

WITNESSES: INVENTOR:
Robert Soulberger Olof Ohlsson,
Louisa Browne. BY Drake & Co ATTY'S.

THE NORRIS PETERS CO., PHOTO-LITHO., WASHINGTON, D. C.

UNITED STATES PATENT OFFICE.

OLOF OHLSSON, OF NEWARK, NEW JERSEY.

CENTRIFUGAL SEPARATING-MACHINE.

SPECIFICATION forming part of Letters Patent No. 528,683, dated November 6, 1894.

Application filed February 24, 1894. Serial No. 501,334. (No model.)

*To all whom it may concern:*

Be it known that I, OLOF OHLSSON, a citizen of the United States, residing at Newark, in the county of Essex and State of New Jersey, have invented certain new and useful Improvements in Centrifugal Separating-Machines; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

The objects of this invention are to separate cream from the blue milk with increased facility, to obtain a more perfect and complete separation and, at the same time, to provide a machine of increased capacity; to reduce the cost of construction and to secure other advantages and results some of which will be hereinafter referred to.

The invention consists in the improved centrifugal separating machine, and in the arrangements and combinations of parts hereinafter set forth and finally pointed out in the claims.

Figure 1:
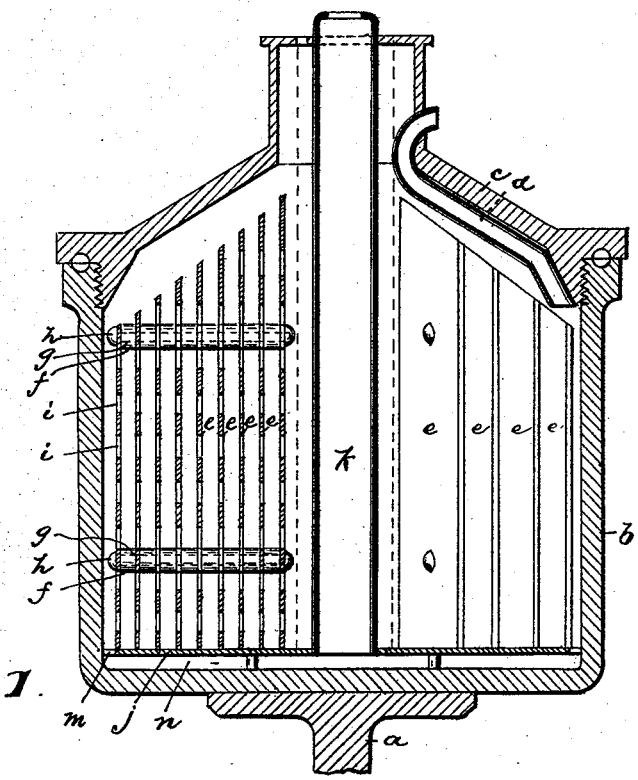
Figure 2:
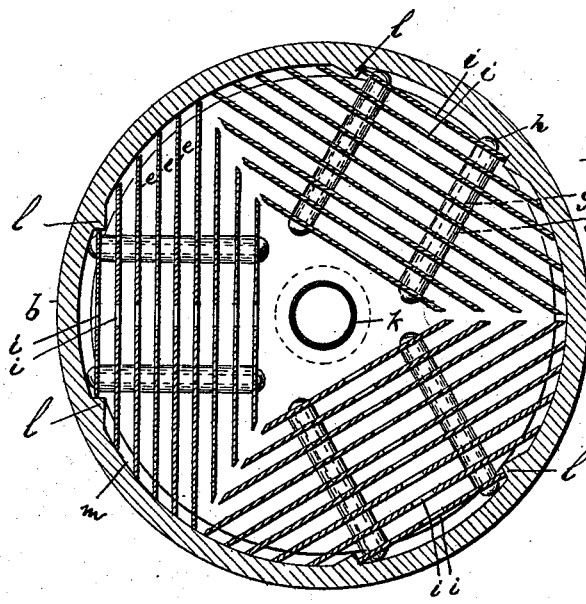
Figure 3:
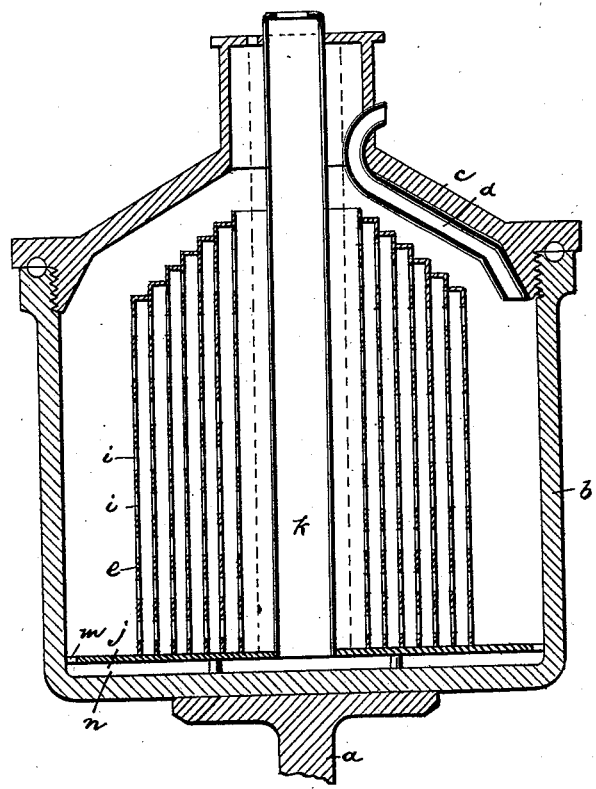
Figure 5:
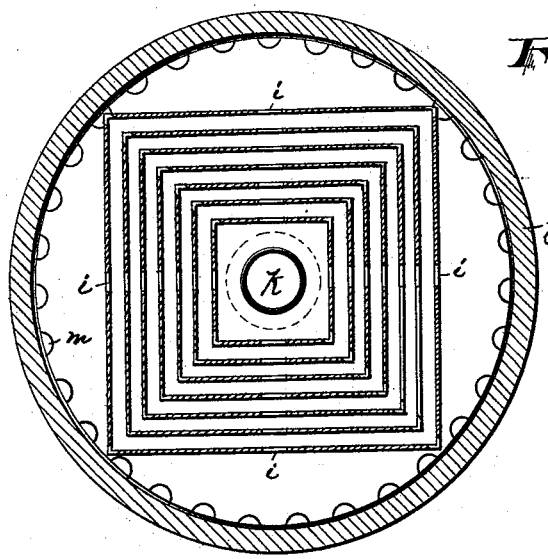
Figure 4:
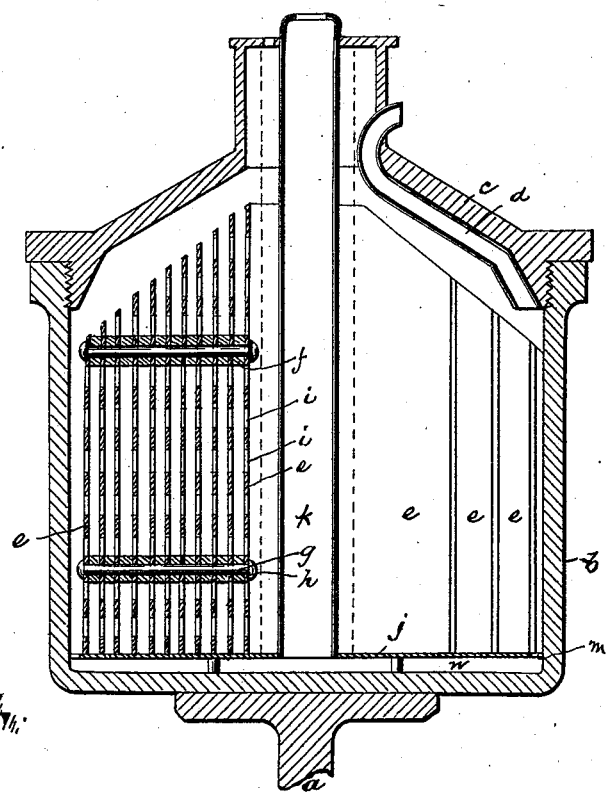

Referring to the accompanying drawings, in which like letters of reference indicate corresponding parts in each of the several figures, Figure 1 is a central vertical section of the improved machine. Fig. 2 is a horizontal section of the same. Figs. 3 and 4 are vertical sections illustrating modifications of tical construction, and Figs. 5 and 6 are horizontal sections of the same.

In said drawings, $a$, indicates a rotary shaft, upon which the bowl, $b$, is seated.

$c$, indicates the cover for said bowl having a central inlet passage or aperture for the milk and a radial blue-milk exit duct or passage, $d$, extending from the periphery of the bowl inward toward the center of the bowl, where it is turned outwardly and extends through the walls of the cover. Within the chamber in said bowl, are arranged vertical plates $e, e$, arranged closely together in series or packs and connected so as to be inserted in and withdrawn from the bowl together with convenience. The said plates $e, e$, are separated from one another by washers, $f$, the spaces between them being thus quite narrow. They are joined by bolts, $g$, which extend through said plates and washers alternately, and are, at their opposite extremities, provided with heads $h$, of any suitable kind adapted to unite the parts. At their centers, or where they approach most closely to the axial centers of the bowl, said plates are perforated, as at $i$, the perforations being in the vertical plane, with said axial center, which cuts the plates at said nearest points.

Figure 6:
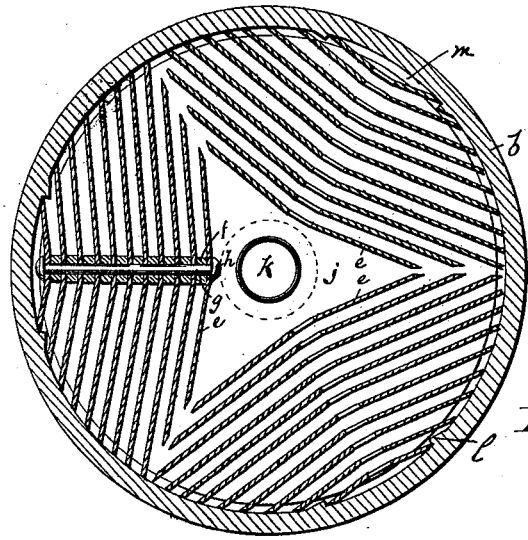

The several vertical plates of each pack are arranged in parallel planes and are preferably flat, although they may be made slightly angular as indicated in Fig. 6, the inclination on the opposite sides of the points of nearest approach being inward, toward the center of the bowl.

At the bottom of the bowl, slightly raised therefrom, is a partition, $j$, which has a perforation at the center that receives a vertical milk supply tube, $k$, the latter extending upward, through the center opening in the cover. Said bottom partition is also provided with milk exits, $m$, near the periphery, allowing an inflow of milk from the narrow or shallow bottom passage upward into the main separating chamber.

The packs are held from disarrangement or independent movement by abutments, $l$, or by any other suitable means, and are preferably made to engage the edges of one another, so that they may be simply slipped into place within the bowl and be secure.

After the plates have been joined as described, they may be, especially when of sheet iron, dipped into a bath of liquid tin. The joints are thus closed so that the cream cannot lodge therein and become rancid.

To reduce the weight of the device, so that the parts will not be affected injuriously by the rapid rotation and reduced power will be able to secure the necessary speed, I may make the slates of aluminum.

The packs are comparatively small and can be easily inserted in boiling water and thoroughly cleansed.

In operating the device, the rotary motion is imparted to the bowl in any usual manner, and the milk is fed downward through the vertical tube, $k$, to the space or passage, $n$, leading outward toward the periphery. Entering the main chamber, it comes in contact with the heavy blue milk devoid of cream and while still at the bottom is thereby forced inward between the plates. The entrances to the chambers between the plates being at the extremities of the latter, and the said plates, at said extremities, being highly inclined to the radii of the bowl, and, furthermore, at said entrance the centrifugal separating pressure being greatest, the cream is forced down the inclines toward the center perforations, $i$. By subdividing the milk immediately upon the entrance of the same to the separating chamber under the high pressure of the periphery, the light and heavy components are separated with great thoroughness, the blue milk on its escape from the machine being almost entirely devoid of cream.

By extending the plates, in plan, like chords of a circle to or closely near the side walls of the cylindrical bowl so that said plates present immediately at the entrance of the new milk, a series of obstructing surfaces crossing the lines of rotary motion and inclined to the lines of centrifugal force, the new milk is divided into thin bodies and is caused to deposit upon each plate a layer of cream globules upon the outer sides which serve to attract by affinity the lightest and smallest particles of cream.

The high inclination of the plates to the centrifugal lines of force, at the extremities of said plates causes the small particles to slide or flow toward the center point of less inclination and as they flow they agglutinate or agglomerate and thus, where the force is less powerful, the body is of sufficient volume and unity to be affected by the less force toward the center and continue its course through the perforations $i$, $i$, to the cream wall and thence out from the machine. The blue milk, or, now, more properly, the transparent residue, flows upward and outward toward the periphery and is carried away through the ducts provided therefor.

While I have shown but three practical variations in the construction of the device, I am fully aware that further variations may be made without departing from the spirit or scope of the invention, and so I do not wish to be understood as limiting myself by positive terms used in the description, excepting as the state of the art may require.

Having thus described the invention, what I claim as new is—

1. The improved centrifugal creamer herein described in which is combined with the bowl, $b$, supply tube $k$, and partition, $j$, vertical plates arranged above said partition and, in plan, extending from the peripheral parts of the bowl inward across the radii of the bowl center, and at the nearest approach to said bowl center having openings or passages $i$, $i$, substantially as set forth.

2. The improved centrifugal separating machine, having therein, series of vertical plates, arranged in the rotary bowl in independent packs, disposed around the center at angles to the radii of the bowl center, with spaces between said plates, said packs being each separable from the bowl or the chamber therein, substantially as and for the purposes set forth.

3. In a centrifugal separating machine, the combination with the rotary bowl, of series of plates joined together, the centers of which lie nearest the center of the bowl and the opposite edges toward the periphery, substantially as set forth.

4. The centrifugal separating machine, in which is combined with the bowl having a bottom partition forming the passage, $n$, and centrally open to receive milk and, at the periphery, forming an opening or openings into the separating chamber, of packs of parallel plates fastened together and arranged edge to edge around the center of the bowl, the said packs providing cream passages at their points of approach to the said center, substantially as set forth.

5. The centrifugal separating machine, in which is combined with the rotary bowl, and cover having a central opening, of a partition, $j$, duct $k$, for leading the milk to the passage formed by said partition, peripheral openings through said partition, plates arranged in series, in separable packs, said series extending toward and from the center, at right angles to given radii of the bowl center, substantially as set forth.

6. The improved centrifugal separating machine, in which is combined with the rotary bowl and a partition having openings at the periphery to admit an outflow of new milk to the separating chamber, of a series of plates arranged above said partition and having their outer edges at said openings to subdivide the milk as it enters, the said partitions crossing the lines of rotary motion and inclining to the lines of centrifugal force, and leading the cream inward, substantially as set forth.

7. The combination with the bowl and the horizontal partition having a central new milk inlet and peripheral new milk exits to the main chamber, of partitions arranged in the main chamber in planes of the chords of the circle of the bowl and provided with a vertical series of perforations where they approach the bowl centers, substantially as set forth.

8. The combination with the bowl and horizontal partitions having an inlet and, toward the periphery, outlets for the milk, of series of parallel plates arranged in the planes of chords of the circle of the bowl and having, at points where said plates approach more nearly the bowl-center perforation to allow an inflow of cream and at the edges having skim milk passages, substantially as set forth.

In testimony that I claim the foregoing I have hereunto set my hand this 13th day of February, 1894.

OLOF OHLSSON.

Witnesses:
    CHARLES H. PELL,
    LOUISA BROWNE,